United States Patent [19]

Meltzer et al.

[11] 3,984,842

[45] Oct. 5, 1976

[54] DEVICE FOR CONTINUOUS ELECTROSTATIC REPRODUCTION OF AN OPTICAL IMAGE

[75] Inventors: David W. Meltzer, Miami, Fla.; John W. Trainor, Pittsford, N.Y.

[73] Assignee: Xerox Corporation, Stamford, Conn.

[22] Filed: May 27, 1975

[21] Appl. No.: 581,010

[52] U.S. Cl. ............................ 346/74 P; 178/6.6 A

[51] Int. Cl.$^2$ ................... G03G 15/04; G01D 15/14

[58] Field of Search ........... 346/74 ES, 74 EB, 74 J, 346/74 S, 74 P; 178/6.6 A

[56] References Cited

UNITED STATES PATENTS

| | | | |
|---|---|---|---|
| 2,986,442 | 5/1961 | Broding | 346/74 EB |
| 3,368,106 | 2/1968 | Berthold | 346/74 P |
| 3,419,888 | 12/1968 | Levy | 346/74 J |
| 3,495,267 | 2/1970 | Brodie | 346/74 P |

*Primary Examiner*—Alfred H. Eddleman
*Assistant Examiner*—Jay P. Lucas

[57] ABSTRACT

Apparatus and method for continuously converting an optical image into an electrostatic image. A vacuum tube device has a source of electrons and associated elements for propagating electronic charge toward an array of conductors coupling an interior surface of the vacuum tube device with an exterior surface of the device. The array of conductors has an extent substantially greater in a first dimension as compared to a second dimension. A photosensitive electrode, interposed between the electron source and the array of conductors modulates the passage of electrons from the source to the array. The modulation results from the presence of stored electronic charge on the electrode, the stored charge of local portion of electrode controlling the passage of electrons through apertures associated with the local portion of the electrode. The charge distribution on the photosensitive electrode can be determined by an optical image, applied to the electrode under appropriate conditions. Electron optics, associated with the vacuum tube device, focus electrons passing through the modulating electrode onto the conductor array. By focusing electrons passing through successive selected regions of the electrode on the conductor array, the charge distribution of the electrode can be scanned by the electrons passing therethrough. The array electrostatic charge, resulting from the deposition of electrons on the conductor array, can be continuously transferred to a dielectric material passing by the external surface of the conductor array. By synchronizing the passage of the dielectric material with the selected regions of the electrode, the stored electrical charge and therefore the optical image can determine an electrostatic image transferred to the dielectric material. The electrostatic image in the dielectric material can be processed and fixed by electrostatograhic techniques. Methods for locally altering the charge distribution are described.

14 Claims, 3 Drawing Figures

DEVICE FOR CONTINUOUS ELECTROSTATIC REPRODUCTION OF AN OPTICAL IMAGE

This invention relates generally to devices for converting optical images into electrostatic images and more particularly to devices in which a stored electronic charge distribution on a control grid determined by an optical image control an accumulation of electronic charge producing an electrostatic replica related to the optical image.

In a copending U.S. patent application, Ser. No. 581,011, filed May 27, 1975 by David W. Meltzer and Narendria S. Goel and assigned to the assignee of the instant application, a vacuum tube device is described in which an externally applied optical image can be utilized to produce an electrostatic image. In this device, the external optical image was utilized to disperse selectively local charge on a generally uniformly charged control grid. The control grid, interposed between a source of electrons and an array of conductors is utilized to control an accumulation of electrons on the conductor array, which results in an electrostatic replica of the optical image. However, for best operation this device required that dielectric medium, to which an electrostatic charge produced by the vacuum device is transferred for processing, must in general be stopped. It is generally desirable to have the medium to which the electrostatic charge is transferred moving at a uniform speed facilitate control of various pre and post-transfer operations and to simplify the control mechanisms determining the movement of the medium.

Similarly, a copending U.S. patent application, Ser. No. 581,012, filed May 27, 1975 by David W. Meltzer and John W. Trainor, and assigned to the assignee of the instant application, a vacuum tube device was described in which a photocathode was utilized to determine the charge distribution of a grid controlling passage of electrons. The electrons were directed to a location in which local accumulation of electrons produced an electrostatic image for transfer to a dielectric medium. The preferred mode of operation of the device was once again a procedure in which the dielectric medium was halted, at least temporarily, for transfer of the (entire) electrostatic image from the device to the dielectric medium. It is desirable, however, in many applications to maintain the dielectric medium in uniform motion.

It is, therefore, an object of the present invention to provide an improved device for producing an electrostatic image from an optical image.

It is a further object of the present invention to provide a device for converting an optical image to an electrostatic image, in which the medium to which the electrostatic image is to be transferred, can be maintained in motion.

It is another object of the present invention to provide for a vacuum tube device wherein an optical image is utilized to determine the distribution of stored charge on a control grid, the control grid modulating the flow of electrons impinging upon an array of conductors, and wherein the vacuum tube device includes apparatus for focusing electrons modulated by a selected portion of the control grid on the conductor array.

It is yet another object of the present invention to provide a device for producing an electrostatic charge distribution wherein the electrostatic image can be continuously transferred to a continuously moving material.

It is still another object of the present invention to provide an electrostatic charge distribution output signal determined by a portion of an optical image having a generally linear geometry.

It is a still further object of the present invention to provide an improved method of producing a multiplicity of electrostatographic reproductions of an optical image.

It is a more particular object of the present invention to provide apparatus for storing an electrostatic replica of an entire optical image, and for producing an electrostatic charge distribution determined by a selected linear portion of the stored electrostatic replica.

The aforementioned and other objects of the present invention are accomplished by providing a vacuum tube housing; an array of conductors electrically coupling an interior surface of the vacuum tube housing with an exterior surface of the housing; a source of electrons including associated electric field elements for propagating electrons toward the array; a light sensitive control grid interposed between the electron source and the array of conductors for modulation of the electron density reaching the array; and means for focusing electrons modulated by the control grid on the array of conductors. An optical image applied to the light-sensitive control grid establishes a charge distribution on the control grid. The charge density determines the density of electrons passing through localized portions of the control grid. The focusing means applies a controllable portion of the electrons modulated by the control grid to the array of conductors. In the preferred embodiment, the focusing means applies electrons modulated by a region of the control grid having substantially greater extent in a first dimension, i.e. a line of the control grid, to the conductor array.

An electrostatic charge, resulting from accumulation of electrons on the conductor array, can be transferred from the exterior surface array to a dielectric medium located in the vicinity of the array. When the dielectric medium is maintained in synchronized motion with electrons modulated by successive regions of the control grid, the charge distribution of the control grid and ultimately the applied optical image can determine the electrostatic image on the dielectric medium, which is capable of being processed and fixed. A multiplicity of copies of the applied optical image can be produced before unacceptable deterioration of the charge image on the control grid.

The electrostatic charge distribution of the control electrode can be locally altered for correction or adjustment of the applied optical image copied.

These and other features of the invention will be understood upon reading the following description along with the drawings.

Figure 1:
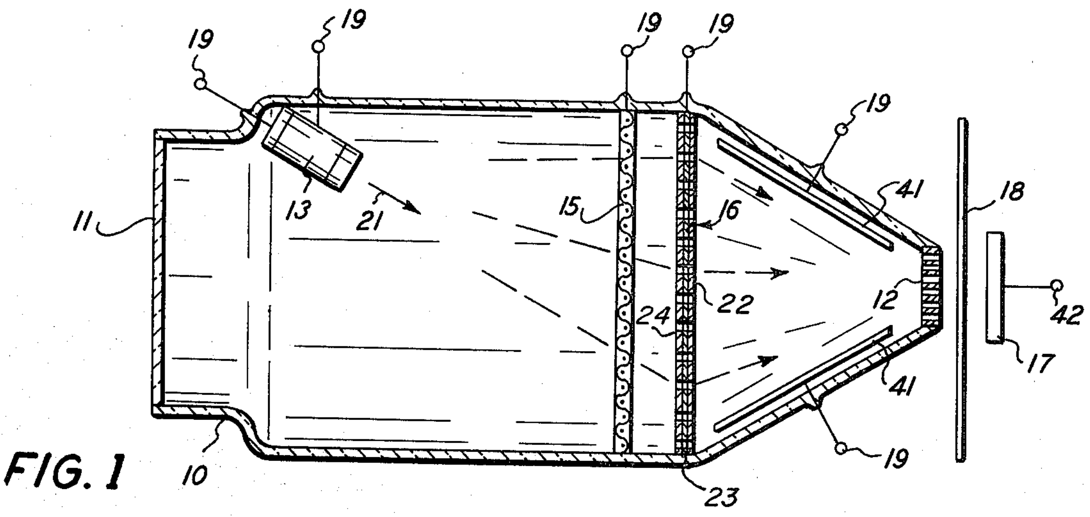
FIG. 1 is a cross-section view of the apparatus for producing an electrostatic image determined by an optical image according to the instant invention.
Figure 2:
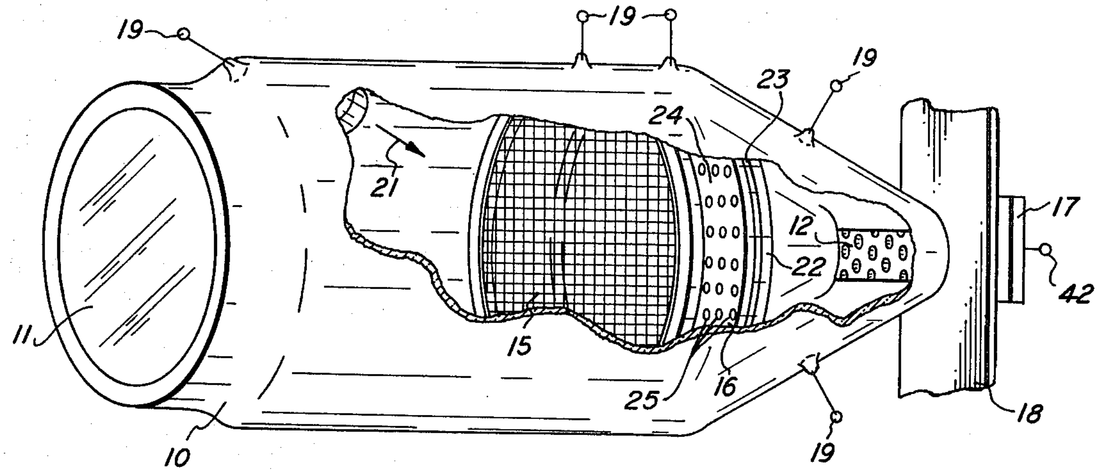
FIG. 2 is a cut-away cross-sectional view of the apparatus for producing an electrostatic image determined by an optical image according to the instant invention.

Referring now to FIG. 1 and FIG. 2, a schematic cross-section and a cut-away perspective view of the device for converting an optical image into an electrostatic image according to the present invention are shown. An array of conducting elements 12 electrically couple an interior surface of vacuum tube device 10 with an exterior surface. Electrode 16, located before conductor array 12, is a control electrode and is comprised in the preferred embodiment, of a supporting material, a conductive material 23 and a photoconductive material 24. Electrode 16 includes a multiplicity of apertures 25 for transmission of electrons. Electrode 15 is typically a wire mesh and is utilized for collecting and preventing the accumulation of any space charge. Electron source device 13 is typically a cathode ray gun and includes the necessary control electrodes for accelerating, focusing, and scanning the beam of electrons produced therein. Window 11 provides an optical access for applying electromagnetic radiation comprising an optical image to control electrode 16. Window 11 can include image forming apparatus, such as lenses, or the apparatus for forming an image can be located either in whole or in part in the exterior or the interior of the vacuum tube device 10. Arrow 21 is a diagrammatic indication of the electrons propagated from the electron source to the conductive array. Conducting plate 17 provides the ground terminal for the multiplicity of capacitors formed by the (exterior surface of the) conducting array, the dielectric transfer medium, and the ground terminal. The capacitance of the dielectric medium stores the charge which produces the electrostatic image. Terminal 42 can be coupled to ground potential during electrostatic transfer to a dielectric medium. The electrostatic transfer can take place by contact transfer or by electric breakdown.

The dielectric medium to which the electrostatic image is to be transferred is designated by material 18. Material 18 can be a copy sheet upon which the electrostatic image will be processed and fixed therein or material 18 can be an intermediate material upon which the electrostatic image will be developed and from which this developed image can be transferred to the copy sheet prior to the fixing step. The medium can be in contact with conductor array 12, but is shown separated from the surface in FIG. 1 and FIG. 2 for clarity. In the preferred embodiment, conductor array 12 has a much larger dimension perpendicular to the motion of the material 18 than in a dimension parallel to the motion of material 18. In general, array 12 could be a single row of conductors. However, as will be clear to those skilled in the art, it can be possible to achieve better image reproduction with overlapping image segments.

Electrodes 41 include electron optics for focusing a portion of the electrons, transmitted by electrode 16, to array 12. In the preferred embodiment, electrodes 41 focus a linear segment of the transmitted electrons as the substantially linear conductor array 12. Electrodes 19 provide a means for coupling the electrodes 41 as well as electron source 13, mesh 15 and grid conductive layer 24 of 16 to external electronic circuits.

Control grid 16 can be comprised of photoconducting material on a conducting material, the photoconducting material being positioned nearer to the electron source and optical window 11. The control grid 16 has a multiplicity of apertures 25 permitting relatively free transmission of electrons from electron source 13 to conductor array 12 upon application of appropriate voltage levels to terminals 19. In another embodiment, a wire mesh can serve as both the conductive material and the supportive material while providing the multiplicity of apertures. The photoconducting material can be deposited on the side of the mesh closer to the electron source and window 11.

Figure 3:
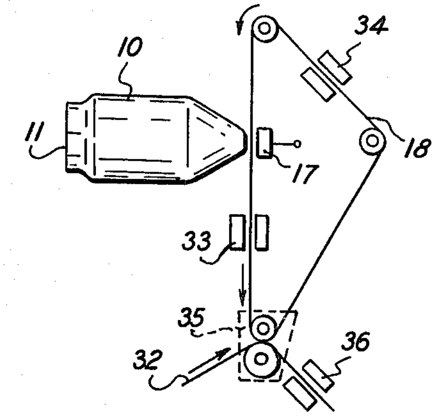
FIG. 3 is a schematic diagram of the apparatus for producing an electrostatic image determined by an optical image utilized in a generalized electrostatographic reproduction system.

Referring next to FIG. 3, the schematic diagram of an electrostatographic copy system, utilizing the vacuum tube device in the instant invention, is shown. An optical image can be applied to electrode 16 of device 10 via window 11. Device 10, thereafter, applies an electrostatic image to medium 18. The electrostatic image is developed at station 33 and transferred to an appropriate web material 32 at station 35. The transferred image can be fixed at station 36. The medium 18 is cleaned and prepared at station 34 for transfer to another electrostatic image. By way of example, station 33 can apply appropriately charged ink droplets to medium 18. The image is contact-transferred at transfer station 35 to copy sheet 32, the ink being absorbed by the web material. Station 34 removes the remaining ink and remaining electrostatic charge before preparing the medium 18 for receipt of another electrostatic image. It will be clear to those skilled in the art of electrostatic image processing that the embodiment of the processing stations will be a function of the particular image processing techniques. It will be further clear that copy sheet 32 can be substituted directly for medium 18 and the electrostatic image directly applied to the copy sheet 32 for development and fixing of the image. However, raw copy sheet material for which an image can be fixed, can frequently have undesirable properties for passing by the face (i.e. on the exterior conductor array surface) of the electrostatic image forming device.

In order to provide an electrostatic image from an optical image, the conducting portion of control electrode 16 has a suitable potential applied in order to attract electrons thereto from the source of electrons. The electrons, attracted by the potentials of conducting portion, strike the photoconducting portion of control electrode 16. The photoconducting portion of the control electrode, not being illuminated, is an electrical insulator and the electrons reaching the photoconducting material are trapped. In this manner, a generally uniform charge can be applied to control electrode 16. Other methods of obtaining a uniform charge can be utilized.

An optical image is focused thereafter through window 11 on control electrode 16. The radiation impinging on electrode 16 causes photoconductor material to become conductive. The conducting portion of electrode 16 is held at a suitable potential and the trapped electrons, under the influence of the applied radiation can reach the conducting portion of electrode 16 and be removed from the device 10. The rate at which electrons are dispersed to the conducting portion stored in a local area is related to the intensity and duration of the applied radiation in that local area. Thus, after the applied image is removed, an electrostatic charge distribution, determined by the applied optical image density remains on the electrode 16.

The source of electrons is activated, propagating electrons through the control electrode 16 to conducting array 12. The electrostatic charge distribution on control electrode 16 modulates density of electrons reaching conductor array 12. The modulation results because, under appropriate conditions of electron velocity and potential applied to the conducting portion of electrode 16, the density of electrons passing through each of the multiplicity of apertures, will be determined by the charge trapped on the photoconductor in the vicinity of each aperture. Thus, the electrons reaching the conductor array 12 provides the electrostatic image resulting from the previously accumulated charge on control grid 16 and results in a master electrostatic image which can be transferred to medium 18.

In the preferred embodiment, the electron optic electrodes 41 focus electrons passing through control grid 16 onto the conductor array 12. The potentials applied to electrodes 41 can direct all transmitted electrons to conductor array 12, and the focusing potentials of cathode ray gun 13 are utilized to provide a plane of electrons addressing a generally linear region of control electrode 16, the particular region determined by the potentials applied to the cathode ray gun. According to another embodiment, the potentials applied to electrodes 41 again cause all the transmitted electrons to be directed to the conductor array 12, while the potentials applied to electron gun 13 result in a focused electron beam. The potentials controlling the electron gun scan successive linear regions of control electrode 16. Thus, a linear portion of the charge, determined by the applied optical image, trapped in electrode 16 results in a corresponding electrostatic charge stored on the conductor array. In another embodiment, utilizing techniques of electron optics known to those skilled in the art, electrodes 41, in response to appropriate applied potentials, selectively focus electrons from a generally linear region of the control grid onto the array of conductors. In this embodiment, the entire control electrode can be flooded with a diffuse beam of electrons. However, accumulation of electrons on the conductor array will be corresponding slower.

When sufficient charge is accumulated, an electrostatic charge is transferred to dielectric material 18. If the material 18 is moved in synchronism with scanning, in a direction generally perpendicular to linear portions of the control grid, a complete electrostatic replica, determined by the applied optical image can be produced. Further, a multiplicity of replicas is possible, after the trapped charge on the control electrode 16 is determined. Further, by appropriate control of the linear region from which electrons are applied to the conductor array, the material 18 receiving the electrostatic charge from array 12 can be kept in continuous motion.

The electrostatic charge image stored on control electrode 16 will eventually deteriorate because positive ions generated within the device 10 discharge control grid 16. Nonetheless, it is possible to produce a multiplicity of electronic charged images on medium 18 before deterioration of the stored image on control electrode 16 results in unacceptable reproduction of the image and the electrostatic image must be refreshed or changed.

In addition to the electrostatic charge replica produced by the application of an optical image to a generally uniform distribution of electrons trapped in the photoconducting portion of the control grid, an image reversed electrostatic charge replica can also be stored, on the control grid. In order to obtain the image-reversed replica, electrons from the electron source are accelerated toward the photoconducting material with sufficient energy so that, on the average, each electron striking the photoconducting material causes more than one electron to be ejected from the material (i.e. by secondary emission). Thus, a generally uniform positive charge (resulting from the missing electrons) can be placed on the control grid. The subsequent application of the optical image to the control grid causes a neutralization of the positive charge. The degree of local neutralization is determined by the local intensity and duration of the optical image. The remaining electrostatic charge distribution can upon application of appropriate potentials to the vacuum tube terminals, produce a electrostatic charge replica on the conductive array which is image reversed from the image produced by applying the optical image to a uniform distribution of trapped electrodes on the control grid.

In order to provide a change or correction of the charge trapped on control electrode 16, two methods can be utilized. A focused electron beam, used in conjunction with a collimated radiation source, can be used to control the stored charge of the local region of control electrode 16. A second method of local correction is provided when an electron beam, focused by the cathode ray gun, has a controllable acceleration potential which can be adjusted into a range resulting in secondary emission. Where the number of electrons resulting from the secondary emission is greater than (or less than) the number of electrons striking the photoconducting surface, the amount of charge stored on a local region of control electrode 16 can be correspondingly decreased (increased). Thus, the stored charge can be controlled and localized in the region of the control electrode.

It will be clear to those skilled in the art that the pattern of apertures of mesh 15 and the pattern of apertures of control electrode 16 and any pattern of the conducting elements of array 12 must be chosen to minimize systematic patterns in the electrostatic image stored on conductor tray 12.

The above description is included to illustrate the operation of the preferred embodiment and is not meant to limit the scope of the invention. The scope of the invention is to be limited by the following claims. From the above discussion, many variations will be apparent to those skilled in the art, that would yet be encompassed by the spirit and scope of the invention.

What is claimed is:

1. A device for producing an electrostatic image determined by an optical image comprising:

a housing;

an array of conductors electrically coupling an interior surface of said housing with an exterior surface of said housing;

means for propagating electrons toward said array;

storage means responsive to an optical image for storing a distribution of charges related to said optical image, said storage means modulating said electrons propagating toward said array in accordance with said charge distribution; and means for focusing said modulated electrons on said array.

2. The device for producing an electrostatic image of claim 1, wherein said array of conductors has a substantially greater extent in a first dimension as compared to a second dimension, said focusing means directing "modulated" electrons from a selected portion of said storage means to said array.

3. The device for producing an electrostatic image of claim 1, including means for altering a portion of the charge distribution on said storage means.

4. The device for producing an electrostatic image of claim 1, including means for creating a reversed electrostatic charge replica of said optical image on said storage means.

5. An improved vacuum tube device of the type having a vacuum tube housing with an interior surface coupled to an exterior surface by a multiplicity of conducting elements and an electron gun, electrons from said electron gun providing an electrostatic charge on said multiplicity of conducting elements, wherein the improvement comprises:

a control grid interposed between said electron gun and said conducting elements, said control grid including means responsive to an applied optical image for storing a charge distribution related to said optical image;

focusing means for directing electrons passing through said control grid to said conducting elements, and an optical access associated with said housing for applying said image to said control grid.

6. The improved vacuum tube device of claim 5, including means for altering a selected location portion of the charge distribution on said control grid.

7. A system for providing an electrostatographic reproduction of an optical image comprising:

a vacuum tube device including;

an electron gun, a multiplicity of conducting elements forming a wall section of said device, said conducting elements being adapted to accumulate an electric charge, and a control grid for controlling the accumulation of electric charge on said conducting elements, said control grid including means for controlling said electric charge accumulation in accordance with the applied optical image;

a movable dielectric material for receiving accumulated charge from said conducting elements, means for moving said material during transfer of said accumulated charge, and means for processing and fixing an image determined by said transferred charge.

8. The system for electrostatographic reproduction of claim 7, wherein the electric charge accumulated on said conducting elements is related to a linear region of the applied optical image.

9. The system for electrostatographic reproduction of claim 7, including means associated with said vacuum tube device for selectively altering a portion of the charge distribution on said conducting elements.

10. Apparatus for providing an electrostatic image determined by an optical image comprising:

a housing, a portion of said housing comprising a multiplicity of conducting elements electrically coupling the interior of said housing with the exterior;

an electron source for propagating electrons toward said conducting elements, accumulation of electrons by said conducting elements providing an electrostatic charge distribution;

a control electrode for storing a master electrostatic charge replica of said optical image, said replica controlling the accumulation of said electrons on said conducting elements, said control electrode being interposed between said electron source and said conducting elements, said electrode including at least a photoconducting portion and a conducting portion, a second portion of said housing comprising an optical access port to permit applying of said optical image to said control electrode photoconducting portion; and means for focusing electrons transmitted by said control electrode on said conducting elements.

11. The apparatus for providing an electrostatic image of claim 10, wherein said focusing means includes an electron optics device.

12. The apparatus for providing an electrostatic image of claim 10, wherein the extent of said conducting elements is substantially greater in one dimension than the extent of said conducing elements in a second dimension.

13. The apparatus for providing an electrostatic image of claim 10, further including means for altering a portion of said master electrostatic replica stored on said control electrode.

14. The apparatus for providing an electrostatic image of claim 10, including means for storing an image-reversed electrostatic charge replica on said control electrode.

* * * * *